US009032059B2

(12) United States Patent
Osuga et al.

(10) Patent No.: US 9,032,059 B2
(45) Date of Patent: May 12, 2015

(54) CONTENT DELIVERY MANAGEMENT APPARATUS, CONTENT DELIVERY MANAGEMENT METHOD, AND CONTENT DELIVERY MANAGEMENT PROGRAM

(75) Inventors: Toru Osuga, Tokyo (JP); Eiji Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 334 days.

(21) Appl. No.: 13/144,479

(22) PCT Filed: Jan. 7, 2010

(86) PCT No.: PCT/JP2010/050077
§ 371 (c)(1),
(2), (4) Date: Jul. 13, 2011

(87) PCT Pub. No.: WO2010/082523
PCT Pub. Date: Jul. 22, 2010

(65) Prior Publication Data
US 2011/0276677 A1 Nov. 10, 2011

(30) Foreign Application Priority Data
Jan. 13, 2009 (JP) ................................ 2009-004461

(51) Int. Cl.
*G06F 15/173* (2006.01)
*H04H 20/42* (2008.01)
*H04N 21/2543* (2011.01)
(Continued)

(52) U.S. Cl.
CPC ........... *H04H 20/42* (2013.01); *H04N 21/2543* (2013.01); *H04N 21/25891* (2013.01); *H04N 21/47211* (2013.01)

(58) Field of Classification Search
CPC .......... H04N 21/2393; H04N 21/2543; H04N 21/26258; H04H 20/42
USPC ............. 455/428; 705/36 R, 14, 28; 709/248, 709/232, 217–218, 223, 219; 370/253, 338, 370/428; 725/101
See application file for complete search history.

(56) References Cited

U.S. PATENT DOCUMENTS

2005/0038913 A1\* 2/2005 Yasuda .......................... 709/248
2005/0249175 A1\* 11/2005 Nasu et al. .................... 370/338
2006/0294561 A1\* 12/2006 Grannan et al. .............. 725/101
(Continued)

FOREIGN PATENT DOCUMENTS

JP 2000101642 A 4/2000
JP 2001217840 A 8/2001
(Continued)

OTHER PUBLICATIONS

International Search Report for PCT/JP2010/050077 mailed Feb. 2, 2010.

*Primary Examiner* — Jungwon Chang
(74) *Attorney, Agent, or Firm* — Sughrue Mion, PLLC

(57) ABSTRACT

An apparatus, a method, and a program for managing content delivery by which a content is able to be delivered by an optimum delivery variation for the user even when the delivery condition of the content varies with time are provided. The content delivery management apparatus prospects a delivery condition at each of a plurality of future times for a plurality of content delivery variations respectively, and sends a delivery condition data including a correspondence relation between the prospected delivery condition and the plurality of future times to a user terminal.

13 Claims, 8 Drawing Sheets

(51) Int. Cl.
*H04N 21/258* (2011.01)
*H04N 21/472* (2011.01)

(56) References Cited

U.S. PATENT DOCUMENTS

| | | | |
|---|---|---|---|
| 2007/0011061 A1* | 1/2007 | East | 705/28 |
| 2007/0042770 A1* | 2/2007 | Yasui et al. | 455/428 |
| 2007/0124416 A1* | 5/2007 | Casey et al. | 709/217 |
| 2007/0219895 A1* | 9/2007 | Cooper et al. | 705/36 R |
| 2007/0280279 A1* | 12/2007 | Mituhasi et al. | 370/428 |
| 2008/0147505 A1* | 6/2008 | Davis | 705/14 |
| 2008/0155059 A1* | 6/2008 | Hardin et al. | 709/218 |
| 2009/0010177 A1* | 1/2009 | Vogl et al. | 370/253 |
| 2009/0106451 A1* | 4/2009 | Zuckerman et al. | 709/239 |

FOREIGN PATENT DOCUMENTS

| | | |
|---|---|---|
| JP | 2001283015 A | 10/2001 |
| JP | 2002092502 A | 3/2002 |
| JP | 2002123446 A | 4/2002 |
| JP | 2002232563 A | 8/2002 |
| JP | 2006039952 A | 2/2006 |
| JP | 2006203720 A | 8/2006 |

* cited by examiner

Fig. 2A

| AVAILABLE DELIVERY VARIATION | BASIC INFRASTRUCTURE USAGE CHARGE | SIMULTANEOUSLY DELIVERABLE NUMBER | DELIVERY SCHEDULE | CHARGE CALCULATION METHOD |
|---|---|---|---|---|
| ON DEMAND | INFRASTRUCTURE CHARGE 1 | NUMBER 1 | — | F(X1) |
| MULTICAST | INFRASTRUCTURE CHARGE 2 | NUMBER 2 | SCHEDULE 2 | F(X2) |
| BROADCAST | INFRASTRUCTURE CHARGE 3 | NUMBER 3 | SCHEDULE 3 | F(X3) |
| ⋮ | ⋮ | ⋮ | ⋮ | ⋮ |

Fig. 2B

|  | QUALITY | CHARGE | TIME LENGTH |
|---|---|---|---|
| CONTENT A | QUALITY A | CHARGE A | TIME LENGTH |
| CONTENT B | QUALITY B | CHARGE B | TIME LENGTH |
| CONTENT C | QUALITY C | CHARGE C | TIME LENGTH |
| ⋮ | ⋮ | ⋮ | ⋮ |

Fig. 3

| DELIVERY VARIATION | MULTICAST | | | | BROADCAST | | | | ON DEMAND | | | |
|---|---|---|---|---|---|---|---|---|---|---|---|---|
| TIME | t₄ | t₃ | t₂ | t₁ | t₄ | t₃ | t₂ | t₁ | t₄ | t₃ | t₂ | t₁ |
| THE NUMBER OF USER ON USAGE | 30 | 35 | 89 | 21 | 28 | 13 | 10 | 45 | 108 | 79 | 23 | 41 |
| DELIVERY CHARGE | CHARGE 4 | CHARGE 3 | CHARGE 2 | CHARGE 1 | CHARGE 4 | CHARGE 3 | CHARGE 2 | CHARGE 1 | CHARGE 4 | CHARGE 3 | CHARGE 2 | CHARGE 1 |

CONTENT DELIVERY MANAGEMENT APPARATUS, CONTENT DELIVERY MANAGEMENT METHOD, AND CONTENT DELIVERY MANAGEMENT PROGRAM

The present application is the National Phase of PCT/JP2010/050077, filed Jan. 7, 2010, which claims a priority based on the Japanese Patent Application No. 2009-004461, and the contents disclosed in the Japanese Patent Application No. 2009-004461 is incorporated herein by this reference.

TECHNICAL FIELD

The present invention relates to a content delivery management apparatus, a content delivery management method, and a content delivery management program.

BACKGROUND ART

With the enhancement in computer performance and broadband networks, services for delivering contents such as videos and images to users become widely used. With this, variations of providing contents and infrastructures used to deliver contents have become diverse. In the following explanation, variations for delivering a content (which is a combination of variation for providing a content and an infrastructure) is described as the delivery variation.

As some examples of the content delivery variations, the broadcast, the multicast, and the on-demand (unicast) can be referred to. In the broadcast, a plurality of contents are delivered to all users. The user selects and watches a desired content among the plurality of delivered contents. In the multicast, the user selects a desired channel. In the channel, a predetermined content is delivered to the user desiring the channel at a predetermined period (or a schedule). In the on-demand, the user selects a content to watch. Then, the selected content is delivered to the user.

On the other hand, as the infrastructure, for example, a ground wave, a satellite broadcasting, the Internet, a dedicated line can be referred to.

Here, a case is considered in which a company who provides content delivery services is able to deliver a content through a plurality of delivery variations. In such a case, a delivery variation desirable for the company is not always one which is desirable for users. For example, it is assumed that the company has a delivery variation in which an image content is delivered through the Internet by multicast. Such a delivery content is highly desirable for the company side in view of the low delivery cost. However, for a user, such a delivery variation may be inconvenient caused by various reasons such that the content is not available at a desired time or the image quality is deteriorated by packet loss or jitter and so on. If the number of users decreases by such inconveniences, it becomes critical loss for the company side.

Then, it is desired that an optimum delivery variation is selected from a plurality of delivery variations.

A related technique is described in Japanese Patent Application Publication JP-2001-283015A. In this literature, a content management server, a plurality of delivery servers which download content data in response to a request from a user terminal, and a distribution route transmission server are included. The content management server refers to a condition for responding to a download request from a user terminal and an activity condition of the distribution server, compares with a current content supply capability, identifies a delivery server which has a capability to supply content data to the user terminal under a set condition, and sends distribution route information which includes charging information required for the delivery from the distribution server to the distribution route transmission server and the user terminal. The user terminal selects a route desirable for itself from them and sends it to the distribution route transmission server.

Further, the followings are some of related techniques which have been available to the inventor of the present invention: Japanese Patent Application Publication JP-2002-92502A; JP-2006-39952A; and JP-2006-203720A.

CITATION LIST

Patent Literature

[PTL1] Japanese Patent Application Publication JP-P2001-283015A

[PTL2] Japanese Patent Application Publication JP-P2002-92502A

[PTL3] Japanese Patent Application Publication JP-P2006-39952A

[PTL4] Japanese Patent Application Publication JP-P2006-203720

DISCLOSURE OF INVENTION

Among delivery variations of a content, there are variations in which a delivery condition (for example, the charge for delivery) varies with time. For example, in a case of utilizing a delivery variation which uses the Internet communication line, there is a case in which the time length required for delivery changes. As a result, the cost required for communication may change and the substantive charge of the content varies independence upon the time zone.

In a case where the delivery condition of a content varies as mentioned above, the delivery variation being currently optimum is not necessarily the optimum delivery variation in future. For example, it is assumed that that a user selects a delivery variation which is considered to be the optimum at time t1. And further it is assumed that the delivery is actually performed at time t2 after t1. In this case, the optimum delivery variation at time t2 may be different from the selected delivery variation. In such a case, the content is not delivered at the optimum delivery variation.

Then, an object of the present invention is to provide an apparatus, a method, and a program for content delivery management capable of performing delivery through an optimum delivery variation.

A content delivery management apparatus according to the present invention includes: a delivery condition estimation means configured to prospect a delivery condition at each of a plurality of future times for a plurality of content delivery variations respectively and to send a delivery condition data including a correspondence relation between the prospected delivery condition and the plurality of future times to a user terminal.

A content delivery management method according to the present invention includes: a step of prospecting a delivery condition at each of a plurality of future times for a plurality of content delivery variations respectively; and a step of sending a delivery condition data including a correspondence relation between the prospected delivery condition and the plurality of future times to a user terminal.

A content delivery management program according to the present invention is a program for realizing method by a computer, wherein the method includes: a step of prospecting a delivery condition at each of a plurality of future times for a plurality of content delivery variations respectively; and a step of sending a delivery condition data including a correspondence relation between the prospected delivery condition and the plurality of future times to a user terminal.

According to the present invention, an apparatus, a method, and a program for content delivery management capable of performing delivery through an optimum delivery variation are provided.

BRIEF DESCRIPTION OF DRAWINGS

FIG. 2A is a conceptual diagram showing an example of information stored in a delivery variation and content information storage section;

FIG. 2B is a conceptual diagram showing an example of information stored in a delivery variation and content information storage section;

FIG. 3 is a conceptual diagram showing an example of history data;

DESCRIPTION OF EMBODIMENT (First Embodiment)

Figure 1:
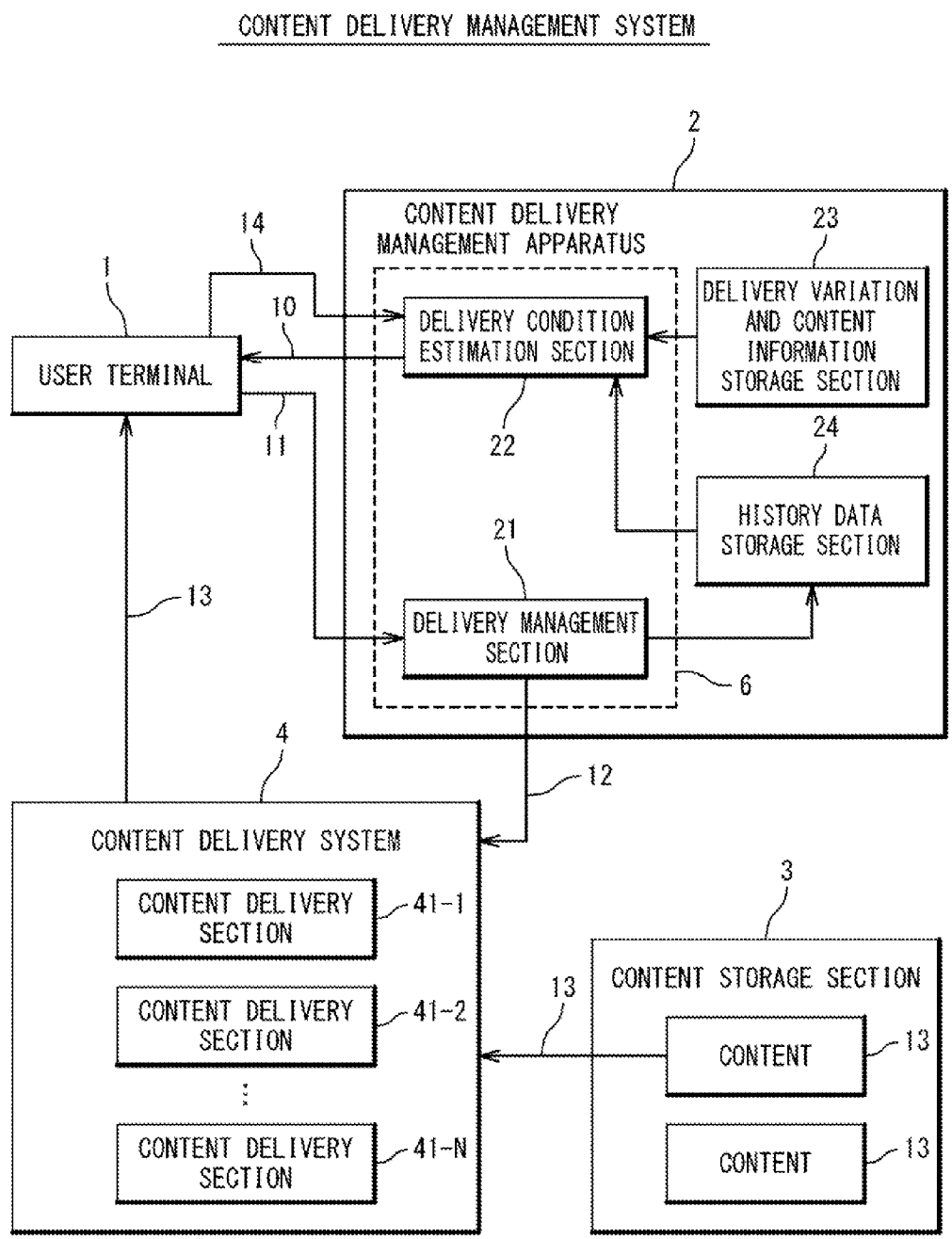
FIG. 1 is a block diagram showing a content delivery management system according to a first embodiment.

A first embodiment of the present invention will be described below with reference to the accompanying drawings. FIG. 1 is a block diagram showing a content delivery management system according to the present embodiment. As shown in FIG. 1, the content delivery management system includes a user terminal 1, a content delivery management apparatus 2, a content delivery system 4, and a content storage section 3. These are connected to be able to communicate with each other through wired or wireless connections.

A group of contents 13 is stored in the content storage section 3. The content delivery system 4 includes a plurality of content delivery sections 41. The plurality of content delivery sections 41 delivers a content 13 to a user terminal 1 with content delivery variations (in the followings, it is simply referred to as the delivery variation) which are different from each other respectively.

This content delivery management system schematically operates as explained below.

A user can select a desired content 13 and a desired delivery variation by using the user terminal 1. The content delivery system 4 reads out the selected content 13 from the content storage section 3 and delivers it by the content delivery section 91 having the selected delivery variation. Further, the content delivery management apparatus 2 prospects a future delivery condition for the plurality of delivery variations, respectively. The delivery conditions are prospected for a plurality of future times, respectively. The content delivery management apparatus 2 generates a prospected delivery condition data to report it to the user terminal 1. By this report, the user is able to know how the delivery condition varies in future, and judge it is preferable for him/herself to enjoy the delivery service of the content when and by what kind of delivery variation. Even in a case where the delivery condition varies with time, it is possible to select the optimum delivery variation.

The content delivery management system according to the present invention will be described in detail below.

In the content storage section 3, image data and the like are stored as a group of contents 13. The content storage section 3 is realized by a storage device like the hard disk. The content storage section 3 may be single or plural. The group of contents 13 stored in the content storage section 3 is provided by a service provider, for example. In FIG. 1, the content storage section 3 is represented independently from the content delivery management apparatus 2. However, the content storage section 3 may be mounted on the content delivery management apparatus 2. The content storage section 3 may be managed by a service provider who performs the content delivery service or may be managed by a content provider other than that service provider.

The content delivery system 4 reads out a predetermined content 13 from the group of contents 13 stored in the content storage section 3 and delivers it to the user terminal 1. The content delivery system 4 has a plurality of content delivery sections 41 (41-1 to 41-N). Each content delivery section 41 is constructed to deliver the content 13 by a predetermined delivery variation. The delivery variation mentioned here is a combination of the infrastructure (a delivery server, routers, and a communication line and sc on) and the content providing variation for delivering the content 13 to the user terminal 1 by using that infrastructure. The delivery variation can be classified into, for example, a periodic delivery variation by which the delivery is periodically performed (the multicast, broadcast and so on), and the on-demand type delivery variation in view of the providing variation of the content. Further, it is classified into the Internet, the NGN (Next Generation Network), the Satellite communication, a dedicated network for image delivery and the like in view of the infrastructure. Moreover, the delivery variations of each content delivery section 4 are not limited to the examples mentioned above.

The user terminal 1 obtains the content 13 delivered from the content delivery system 4 and outputs the obtained content. 13 to the user.

The user terminal 1 has an output device not shown (in the present embodiment, it is a display apparatus), and is able to output information by the output device to the user. Further, the user terminal 1 has an input device not shown. The user can input the selection of a desired content 13 and a delivery variation, and a viewing request of the selected content 13 by the input device. The user terminal 1 can be realized by, for example, a computer, a mobile phone terminal, and a digital television.

The content delivery management apparatus 2 manages the delivery condition of services to each user who has subscribed to the services, estimates the delivery condition (available delivery variation, delivery charge and so on) corresponding to the request sent from the user terminal 1, and reports it to the user terminal 1.

The content delivery management apparatus 2 includes a delivery management section 21, a delivery condition estimation section 22, a delivery variation and content information storage section 23, and a history data storage section 24. In these sections, the delivery management section 21 and the delivery condition estimation section 22 are realized by a content delivery management program 6 installed to a ROM and the like from a storage medium (for example, a DVD).

The delivery variation and content information storage section 23 is provided to store information required for estimating (prospecting) a delivery condition. FIGS. 2A and 2B are conceptual diagrams showing examples of information stored in the delivery variation and content information storage section 23.

As shown in FIG. 2A, in the delivery variation and content information storage section 23, the followings are stored as information related to the delivery variation: information showing a list of available delivery variations; a basic usage charge of the infrastructure used in each delivery variation (for example, a basic usage charge of the Internet communication network, a basic usage charge of a satellite in satellite broadcasting, and the like); a capable number of simultaneous delivery; a delivery schedule; information showing a calculation method of the infrastructure charge (for example, a calculation function) and the like. The delivery schedule is stored for a periodic delivery variation by which the delivery is periodically performed (for example, the multicast delivery).

Further, as shown in FIG. 2B, in the delivery variation and content information storage section 23, as information related to the group of contents 13, information about the quality, the content charge, the time length and the like are stored for each content 13 of the group of contents 13.

As well as the delivery variation and content information storage section 23, the history data storage section 24 is also provided to store information required for prospecting the delivery condition. In the history data storage section 24, a past history of a usage condition is stored for the plurality of delivery variations, respectively. FIG. 3 is a conceptual diagram showing an example of the history data. In the example shown in FIG. 3, the number of user on usage and the delivery charge are shown in a correlation with the time (t4 to t1) for respective delivery variations.

The delivery condition estimation section 22 prospects future conditions for a plurality of delivery variations, respectively, and generates prospected delivery condition data showing the correspondence relation between the prospected delivery condition and a future time. At this time, the delivery condition is prospected for the plurality of future times, respectively. Further, the future delivery condition is prospected based on the reference to the delivery variation and content information storage section 23 and the history data storage section 24. The delivery condition estimation section 22 generates delivery condition data 10 which includes the generated prospected delivery condition data and sends it to the user terminal 1.

The delivery management section 21 receives a report regarding a desired content 13, a desired delivery variation or the like from the user terminal 1. For example, it is assumed that a user selects a desired delivery variation from a plurality of delivery variations by using the user terminal 1. At this time, information showing the selected delivery variation (a selected delivery variation data 11) is sent from the user terminal 1 to the delivery management section 21. The delivery management section 21 selects a content delivery section 41 which corresponds to the delivery variation selected by the user terminal 1. Further, after that, it is assumed that the user performs an input for viewing the content to the user terminal 1. Then, the viewing request is sent from the user terminal 1 to the delivery management apparatus 21. When the viewing request is obtained, the delivery management section 21 reports a delivery instruction data 12 to the content delivery system 4 for delivering the content 13 by the selected content delivery section 41.

Subsequently, an operation method of the above-explained content delivery management system is explained. In this content delivery management system, a delivery condition data is generated periodically, for example. The generated delivery condition data is sent to the user terminal in response to the request from the user terminal. By this, the delivery condition is displayed on the display screen of the user terminal and the user is able to know the delivery condition.

(A Generation Method of a List of Delivery Conditions)

Figure 4:
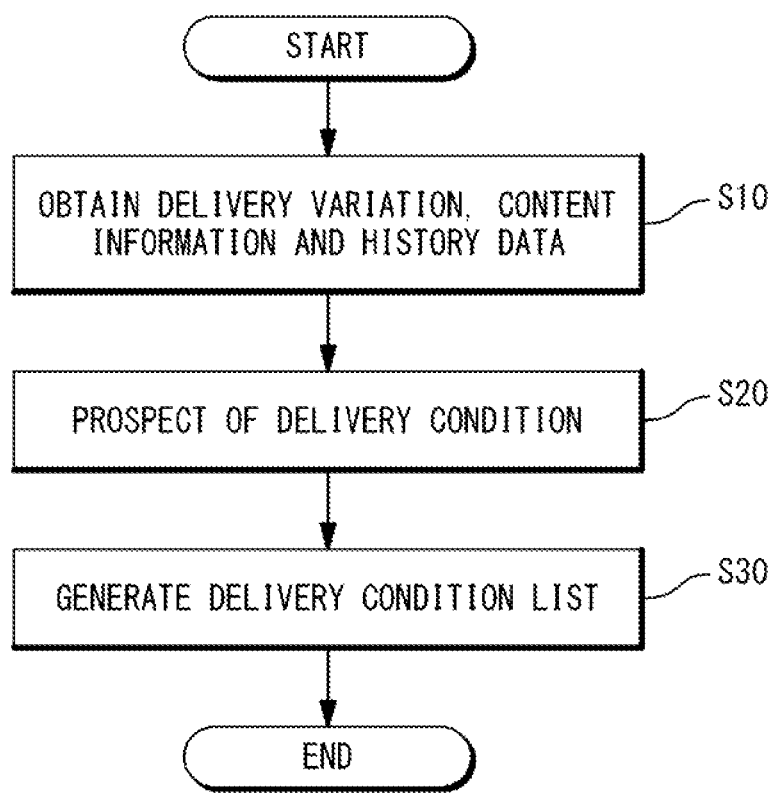
FIG. 4 is a flowchart showing an operation method of a content delivery management system.

At first, an operation when a delivery condition data is generated is explained. FIG. 4 is a flowchart showing an operation when the content delivery management system generates the delivery condition data.

Step S10: Obtainment of the Delivery Variation and Content Information and the History Information In the content delivery management apparatus 2, the delivery condition estimation section 22 obtains information required for prospecting the delivery condition periodically, for example, referring to the delivery variation and content information storage section 23 and the history data storage section 24.

Specifically, the delivery condition estimation section 22 refers to the delivery variation and content information storage section 23 and obtains information regarding a basic value of the charge of infrastructure, information specifying the calculation method of the charge of the infrastructure, the number of sessions capable of being simultaneously delivered (the capacity of the communication line), the delivery schedule and the like, for the plurality of delivery variations, respectively. Information regarding the content 13 like the charge of the content 13, the quality (bit rate), the time length and the like is also obtained. Information regarding the charge of the delivery variation of the content is also obtained. Further, the delivery condition estimation section 22 refers to the history data storage section 24 and obtains history data for a plurality of delivery variations, respectively.

Step S20: Prospecting the Delivery Condition

Next, delivery condition estimation section 22 prospects a future delivery condition for a plurality of delivery variations, respectively, based on the obtained information. The delivery condition is prospected for a plurality of future times, respectively.

Here, the delivery condition is a condition which can be used by a user as a reference to select an optimum delivery variation among a plurality of delivery variations. As a delivery condition, specifically, a delivery charge (the total of the usage charge of the infrastructure, the content 13 itself and the like), the availability of the delivery, the quality, the waiting time for starting delivery or the like are exemplified. Among these, the delivery charge is considered to be important by the user in the selection of an optimum delivery variation in many cases. Therefore, it is preferable to include the delivery charge in the delivery condition.

In a case where the delivery charge is prospected as a future delivery condition, the delivery charge can be prospected based on, for example, a prospected value of the infrastructure charge and a prospected value of the fee required for the communication. The prospected value of the infrastructure charge can be calculated based on, for example, a basic value of the infrastructure charge and a calculation method of the infrastructure charge. On the other hand, the charge required for communication is considered to be dependent to the number of users on usage and the waiting time to the next delivery start time. Namely, the prospected value of the charge required for communication can be calculated from the prospected value of the number of users on usage and the waiting time to the next delivery start time. The prospected value of the number of users on usage can be calculated based on the history of the number of users on usage included in the history data. Namely, the delivery condition estimation section 22 calculates a prospected value of the infrastructure charge based on a basic value of the infrastructure charge and a calculation method of the infrastructure charge. A prospected value of the charge required to communication is also calculated based on the history of the number of users on usage. And the delivery charge is prospected based on the prospected value of the infrastructure charge and the prospected value of the charge required to communication. By this, a future delivery charge can be prospected as a future delivery condition.

Further, a prospected value of the infrastructure charge or a prospected value of the number of users on usage can be calculated by methods as below, for example. At first, most recent N number of numerical values are obtained from the numerical values (the number of selecting user or the infrastructure charge) of a plurality of past times. After that, a N-dimensional function (whose variable is the time and whose value is the numerical value) is derived which satisfies the N number of numerical values simultaneously. Then, by considering the derived N−1 dimensional function as the variation pattern of the numerical value, the numerical values of the plurality of future times are calculated as prospected values. By this, a prospected value of the infrastructure charge and the prospected value of the number of users on usage can be calculated.

When the delivery availability is prospected as the delivery condition, in a case of a periodic delivery variation like the multicast, a future delivery availability can be prospected based on the reference to a delivery schedule. On the other hand, in a case of the on-demand type delivery variation, by using a prospected value of the heaviness degree of traffic of the communication network based on a prospected value of the number of users on usage, the delivery availability can be prospected. Also in a case of prospecting the waiting time to the delivery start time as the delivery condition, for a periodic delivery variation like the multicast, the delivery condition can be prospected based on the reference to the delivery schedule. On the other hand, for an on-demand type delivery variation, the waiting time to the delivery start time can be prospected by using a prospected value of the heaviness degree of traffic of the communication network based on a prospected value of the number of users on usage and the like.

Also in a case of prospecting the quality as the delivery condition, the quality can be prospected by prospecting the heaviness degree of the communication network based on a prospected value of the number of users on usage and the quality of the original content, for example.

Step S30: Generation of a List of Delivery Conditions

The delivery condition estimation section 22 generates a future delivery condition data by correlating the prospected delivery condition (the charge and the availability) with the plurality of times. And other required information is added to the prospected delivery condition data to generate the delivery condition data 10. The delivery condition data 10 shows a list of the delivery conditions. As the list of the delivery conditions, a list based on the EPG (Electronic Program Guide), and the ECG (Electronic Content Guide) are exemplified. The delivery condition data 10 is a screen data for displaying the delivery variation selection screen 5.

Figure 5:
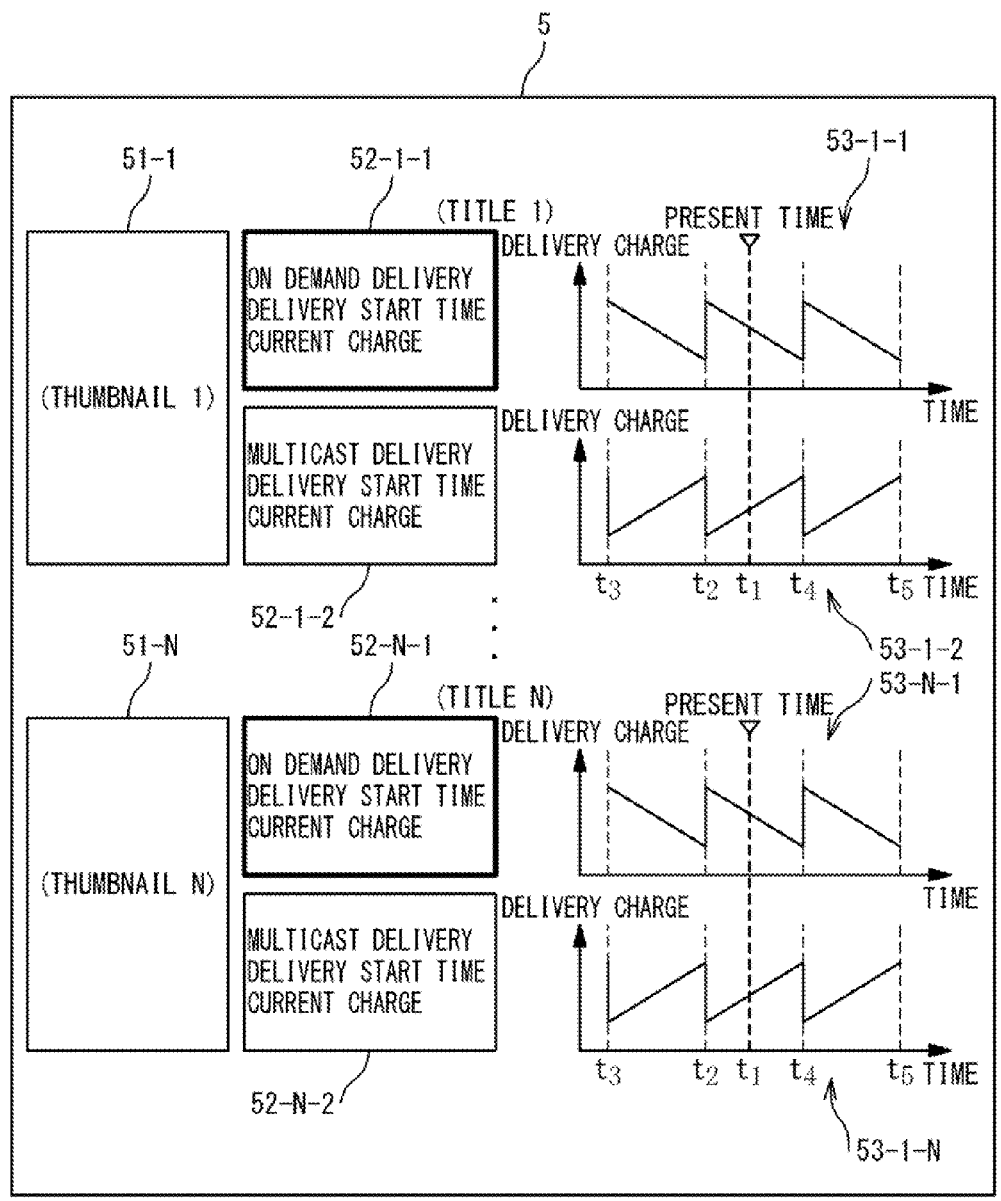
FIG. 5 is a conceptual diagram showing an example of a delivery variation selection screen.

FIG. 5 is a conceptual diagram showing an example of the delivery variation selection screen. As shown in FIG. 5, in the delivery variation selection screen 5, a thumbnail display region 51, a selection region, and a delivery condition display region 53 are formed for every content.

The thumbnail display region 51 is a region in which an image which represents the content 13 is shown. The image data shown in the thumbnail display region 51 may be, for example, stored in advance in the delivery variation and content information storage section 23.

The selection region 52 is formed for every delivery variations, and can be selected by a user. In the selection region 52, information about the status of a delivery variation is displayed. In the example shown in FIG. 5, as information about the status of the delivery variation, a name of the delivery variation (on-demand delivery, multicast delivery and the like), a delivery start time, and a current charge are shown. The delivery start time can be obtained based on, for example, a delivery schedule. Further, the selection region 52 is constructed to show information indicating that a delivery variation is currently available or not. Specifically, in a case of a currently available delivery variation, the frame of the selection region 52 is drawn by a thick line. On the contrary, in a case of a currently not-available delivery variation, the frame of the selection region 52 is drawn by a thin line. However, the display variation for discriminating the availability is not limited to the frame thickness. The availability may be discriminated by other means, for example, the color change of the selection region 52 or the largeness of the frame.

The delivery variation display region 53 is a region in which a correspondence relation between the time and the delivery variation is represented. In the example shown in FIG. 5, the delivery charge is represented as a delivery condition. Namely, a graph whose horizontal axis shows the time and whose vertical axis shows the delivery charge is represented in the delivery condition display region 53. In the delivery condition display region 53, delivery charges are represented for the past, present, and future. The future delivery charge is represented based on the prospected delivery condition data obtained in the step S20 Namely, the future delivery charges are displayed for a plurality of future times. Further, a past delivery charge can be obtained based on the reference to the history data storage section 24.

In the delivery condition display region 53, some delivery conditions other than the relation between the time and the delivery charge may be represented as required. For example, a correspondence relation between the quality of content and the time, or a correspondence relation between the waiting time to the reproduction start and the time may be represented. Also, a correspondence relation between the time and the availability may be represented. The correspondence relation between the time and the availability is represented by, for example, drawing the horizontal axis which shows the time and representing the information of the availability by a symbol ($\bigcirc$, $\Delta$, X) in response to the time.

(Delivery of a Content)

Figure 6:
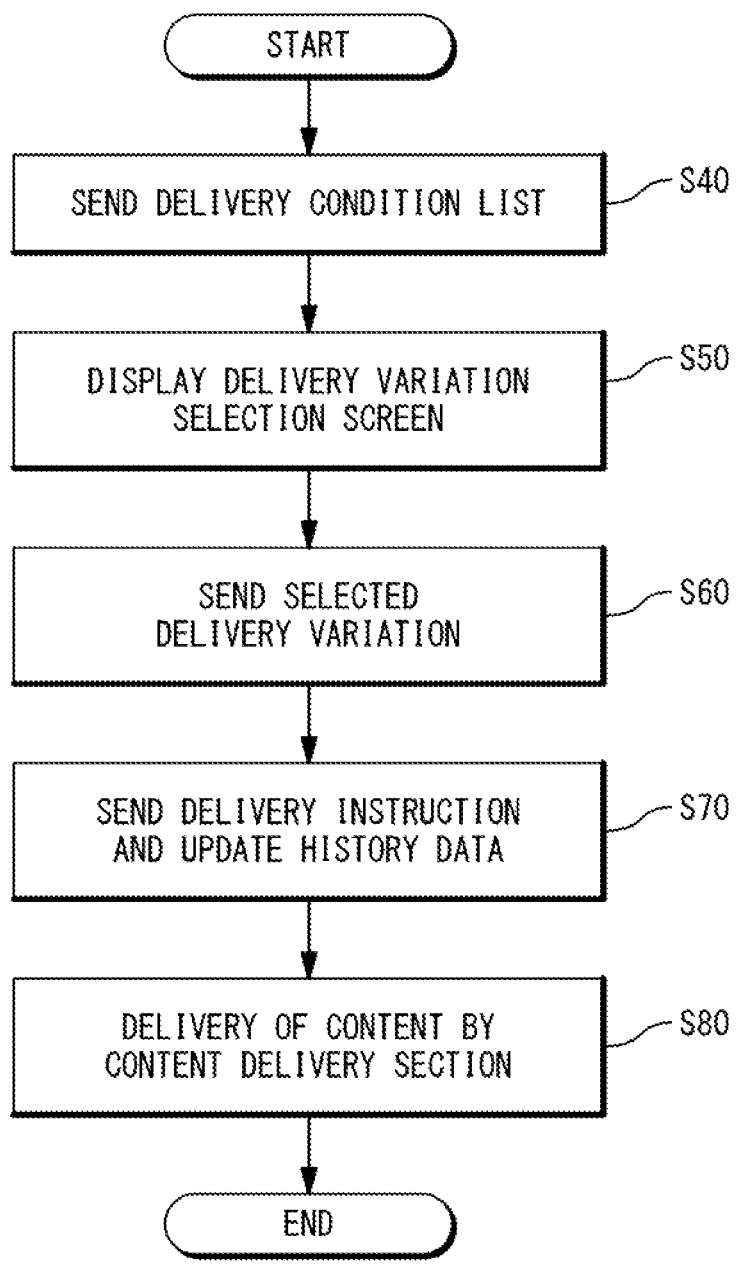
FIG. 6 is a flowchart showing an operation method of a content delivery management system.

Next, an operation in a case where a display request of a list of the delivery condition is sent from a user terminal is explained. FIG. 6 is a flowchart showing an operation in a case where a display request of a list of the delivery condition is sent.

Step S40: Sending of a List of the Delivery Condition

It is assumed that a user performs an input for displaying a list of the delivery conditions by an input device of the user terminal 1. In response to the user's input, a display request 14 of the list of the delivery condition is reported from the user terminal 1 to the content delivery management apparatus 2. The delivery condition estimation section 22 which received the display request 14 sends the delivery condition data 10 to the user terminal 1.

Step S50: Display of a Delivery Variation Selection Screen

The user terminal 1, when the delivery condition data 10 is obtained, displays the delivery variation selection screen 5 indicated by the delivery condition data on a display device.

Step S60: Sending of a Selected Delivery Variation

It is assumed that a user who checked the delivery variation selection screen 5 selects a desired delivery variation by, for example, a click on the selection region 52. As shown in FIG. 5, in a case where a selection region 52 is formed for each content 13, a desired content 13 is also selected among the group of contents 13. The delivery variation selected by the user is reported from the user terminal 1 to the delivery management section 21 as the selected delivery variation data 11.

Step S70: Sending of Delivery Instruction and Updating of History Data

When the selected delivery variation data 11 is reported, the delivery management section 21 selects a content delivery section 41 corresponding to the selected delivery variation from the content delivery system 4. Further, after that, it is assumed that the user inputs a viewing request from the user terminal 1. The viewing request is sent to the delivery management section 21. The delivery management section 21 sends the delivery instruction data 12 to the content delivery system 4 so that the content 13 is delivered by the selected content delivery section 41. Further, after sending the delivery instruction data, the delivery management section 21 accesses the history data storage section 24 and updates information like the number of users on usage, the delivery charge and so on in the history data.

Step S80: Delivery of a Content

In the content delivery system 4, in response to the delivery instruction data 12, the selected content delivery section 91 reads out the content 13 from the content storage section 3. Then, the read out content 13 is delivered to the user terminal 1. The user terminal 1 performs a reproduction and a recording of the delivered content 13.

As explained above, according to the present embodiment, the content delivery management apparatus 2 prospects a delivery condition (the charge or the like) for a plurality of future times and reports it to the user terminal 1. Therefore, the user can check the future variation of the delivery condition and can judge when and by what kind of delivery variation it is appropriate to perform a viewing request of the content 13 more adequately. Namely, even in a case where the delivery condition of the content 13 varies with time, the user can select an optimum delivery variation from a plurality of delivery variations.

In the present embodiment, the content delivery management apparatus 2 is constructed to prospect the future delivery conditions periodically at a predetermined time interval, and the prospected delivery conditions are reported to the user terminal 1. However, the content delivery management apparatus 2 may prospect the delivery condition in response to the display request 14 from the user terminal 14 as a trigger.

Next, a preferable operation when a future delivery condition is prospected (step S20) is explained.

It is assumed that a plurality of delivery variations includes a periodic delivery variation in which a delivery is performed periodically (for example, the multicast delivery). In this case, the delivery condition estimation section 22 is able to prospect the delivery conditions for a plurality of future times, respectively, based on the waiting time to the next delivery start time. Specifically, in a case where a delivery charge is prospected as a delivery condition, at a time where the waiting time to the next delivery start time is long, the number of users on usage is prospected to be small, and the delivery charge is also prospected to be low. On the contrary; at a time where the waiting time to the next delivery start time is short, the number of users on usage is prospected to be large, and the delivery charge is also prospected to be high.

Next, a case where a plurality of delivery variations include both of the periodic delivery variation where the delivery is periodically performed (for example, the multicast delivery) and the on-demand type delivery variation is considered. In this case, the delivery condition estimation section 22 is able to prospect a delivery condition of the on-demand type delivery variation based on the waiting time to the next delivery start time in the periodic delivery variation. Specifically, in a case where a delivery charge is prospected as a delivery condition, when the waiting time to the next delivery start time in the periodic delivery variation is long, the delivery charge of the on-demand type delivery variation is prospected to be high. On the contrary, when the waiting time to the next delivery start time in the periodic delivery variation is short, the delivery charge of the on-demand delivery variation is prospected to be low. When the waiting time to the next delivery start time in the periodic delivery variation is long, the user tends to avoid selecting the periodic delivery variation and select the on-demand type delivery variation. Consequently, the number of users who use the on-demand type delivery variation increases, and the data processing amount required in the on-demand type delivery variation tends to increase. On the other hand, as mentioned above, if the delivery charge of the on-demand type delivery variation is estimated to be high when the waiting time to the next delivery start time in the periodic delivery variation is long, the user tends to avoid the on-demand type delivery variation in view of the delivery charge. As a result, it is possible to diverge the actual number of users on usage to the periodic delivery variation and the on-demand type delivery variation. It is possible to prevent the data processing from concentrating to a specific delivery variation and the computer resources can be efficiently saved.

Further, in the prospect ion of the delivery charge in the multi-cast type delivery variation, the delivery condition estimation section 22 sets the prospected value of the delivery charge at a time when the delivery of the content 13 is already started to be lower correspondingly to the passing time from the delivery start time. In a case where the delivery is already started, the possibility of the user desiring the content 13 is considered to be low. Therefore, by reducing the delivery charge at the time after the delivery is started, the user satisfaction can be increased.

Further, it is assumed that the viewing of a content 13 is set when a user selects a selection region 52 of the periodic delivery variation. In this case, the delivery condition estimation section 22 may decide the prospected value of the delivery charge of the content 13 in response to the number of users who set the viewing. For example, by performing the prospection such that the more the set user number is larger, the more the delivery charge is prospected to be lower, the service provider side can acquire further more users, and the user side can view the content 13 at low cost.

Further, the delivery condition estimation section 22 may prospect the delivery charge of the on-demand type delivery variation in response to the delivery charge of the periodic delivery variation.

(Second Embodiment)

Figure 7:
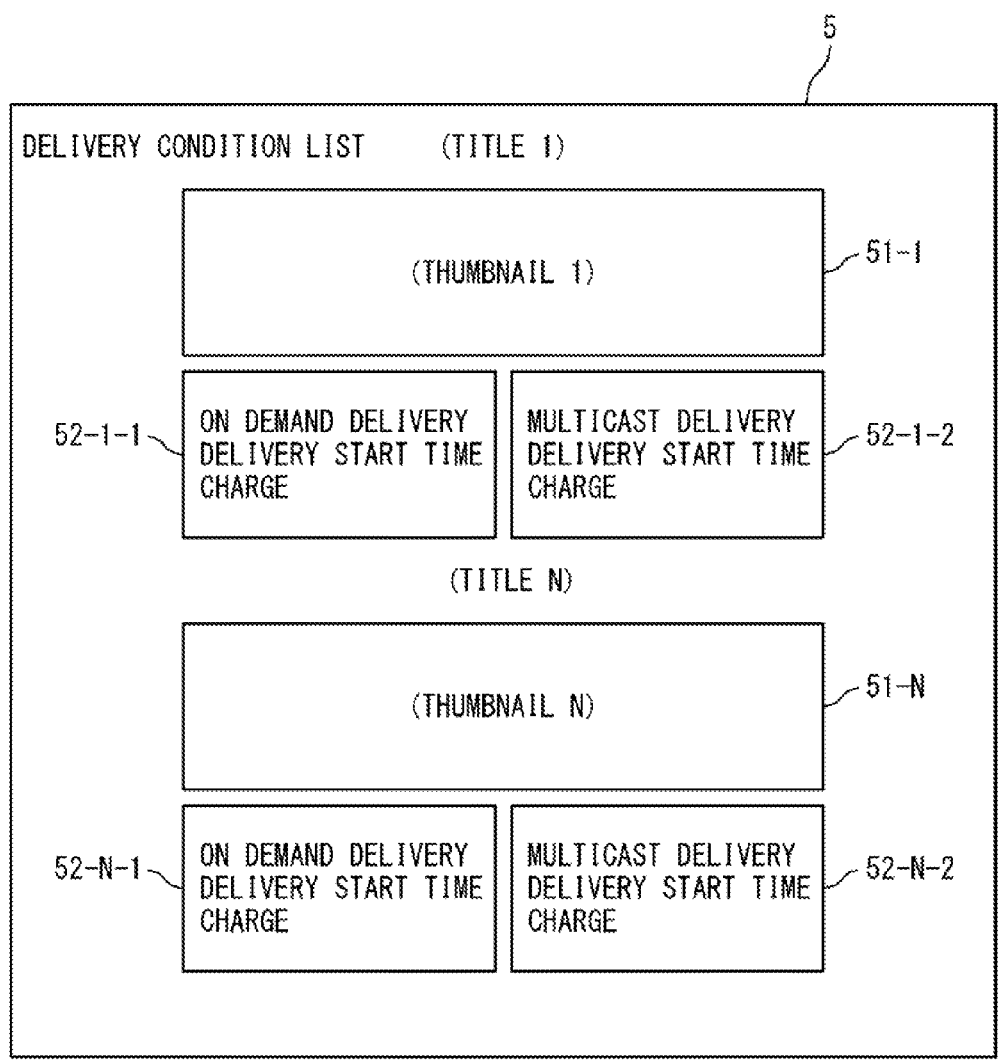
FIG. 7 is a conceptual diagram showing an example of a delivery variation selection screen according to a second embodiment.

Next, a second embodiment of the present invention is explained. The present embodiment is different from the first embodiment in the delivery variation selection screen 5. FIG. 7 is a conceptual diagram of the delivery variation selection screen 5 displayed in the present embodiment. As shown in FIG. 7, in the present embodiment, only thumbnail display regions 51 and selection regions 52 are formed in the delivery variation selection screen 5, and the prospected delivery condition display region 53 in the first embodiment (FIG. 5) is not formed.

In the present embodiment, in the selection region 52, a name of the delivery variation (on-demand delivery, the multicast delivery and the like), a deliver start time, a current time delivery charge (fee) and the like are represented. By this, the user can clearly know various conditions like the delivery start time or the delivery charge when performing the selection of the delivery variation. Namely, it is not required to display another screen to check the delivery start time or the delivery charge. Consequently, the convenience for the user is enhanced.

In the present embodiment, because the prospected delivery condition display region 53 is not displayed, the delivery condition estimation section 22 is not required to prospect a future delivery condition. Though the user cannot know how the delivery condition varies in the future, when performing the selection of the content or the delivery variation, it is possible to know various conditions of the content or the delivery variation simply.

The present invention is applicable to various uses, for example, to a portal site of a content delivery service, a generation apparatus of a service menu, or a play list estimation apparatus by which a user freely try combinations of contents.

The present application claims a priority based on the Japanese Patent Application No. 2009-004461, and the contents disclosed in the Japanese Patent Application No. 2009-004461 is incorporated herein by this reference.

The invention claimed is:

1. A content delivery management system comprising:
a content delivery management apparatus configured to prospect a delivery condition of a content among a plurality of contents at each of a plurality of future times for a plurality of content delivery variations respectively and to send a delivery condition data including a correspondence relation between the prospected delivery condition and the plurality of future times to a user terminal; and
the user terminal configured to display a delivery variation selection screen on which a plurality of regions are displayed, and the correspondence relation sent from the content delivery management apparatus for each of the plurality of contents is displayed on each of the plurality regions,
wherein the delivery variation selection screen is displayed such that a user can select a desired content to be delivered from the plurality of contents displayed on the delivery variation section by an input device of the user terminal,
wherein the plurality of content delivery variations includes a periodic content delivery variation by which a content is periodically delivered,
wherein the delivery condition includes information showing a delivery charge and a waiting time to a next delivery start time in the periodic content delivery variation, and
wherein the content delivery management apparatus is configured to prospect the delivery condition for the periodic content delivery variation such that the delivery change becomes lower as the waiting time to the next delivery start time becomes longer.

2. The content delivery management system according to claim 1, wherein the delivery condition includes information showing a delivery charge which is a user fee for viewing a content.

3. The content delivery management system according to claim 1, wherein the delivery condition includes information showing an availability of a content.

4. The content delivery management system according to claim 1, further comprising delivery condition estimation section configured to send at least one of: the delivery condition at a current time; and a past history of the delivery condition to the user terminal as the delivery condition data.

5. The content delivery management system according to claim 1, further comprising a delivery condition estimation section configured to obtain a history data including a history of the number of users for each of the plurality of content delivery variations and to prospect the delivery condition based on the history data.

6. The content delivery management system according to claim 1, further comprising a delivery condition estimation section configured to prospect the delivery condition based on a waiting time from a plurality of future times to a next delivery start time in prospecting the delivery condition for the periodic content delivery variation.

7. The content delivery management system according to claim 1, wherein the plurality of content delivery variations includes at least one of a multicast type delivery variation and a broadcast type delivery variation as the periodic content delivery variation.

8. The content delivery management system according to claim 1, wherein the plurality of content delivery variations includes: a periodic content delivery variation by which a content is periodically delivered; and an on-demand type delivery variation,
wherein the delivery condition includes information showing a delivery charge and a waiting time to a next delivery start time in the periodic content delivery variation, and
the content delivery management apparatus is configured to prospect the delivery charge for the on-demand type delivery variation such that the delivery charge becomes higher as the waiting time to a next delivery start time in the periodic content delivery variation becomes longer.

9. The content delivery management system according to claim 1, further comprising a delivery condition estimation section configured to report a data to the user terminal such that a delivery variation selection screen is displayed on a display device included in the user terminal as the delivery condition data, and
the delivery variation selection screen includes a prospected delivery condition display region showing a correspondence relation between the plurality of future times and the delivery condition for each of the plurality of content delivery variations.

10. The content delivery management system according to claim 9, wherein the delivery variation selection screen includes selection regions on a screen which are selected by a user for the plurality of content delivery variations respectively, and
information relating to each of the plurality of content delivery variations is represented in each of the plurality of selection region.

11. The content delivery management system according to claim 10, wherein in the delivery variation selection screen, the plurality of selection regions relating to the plurality of content delivery variation are displayed in side by side.

12. A content delivery management method comprising:
prospecting a delivery condition at each of a plurality of future times for a plurality of content delivery variations respectively;

sending a delivery condition data including a correspondence relation between the prospected delivery condition and the plurality of future times to a user terminal;

displaying on regions of a delivery variation selection screen a corresponding plurality of content are displayed;

permitting selection of a content from among the plurality of contents displayed on the delivery variation selection screen by an input device of the user terminal; and storing the content that is selected being stored among a group of contents in a content storage section, wherein the plurality of content delivery variations includes a periodic content delivery variation by which a content is periodically delivered, wherein the delivery condition includes information showing a delivery charge and a waiting time to a next delivery start time in the periodic content delivery variation, and wherein the delivery condition is prospected for the periodic content delivery variation such that the delivery change becomes lower as the waiting time to the next delivery start time becomes longer.

13. A computer-readable, non-transitory medium storing a content delivery management program, which when executed by a computer, causes the computer to perform a method, wherein the method comprises:

prospecting a delivery condition at each of a plurality of future times for a plurality of content delivery variations respectively;

sending a delivery condition data including a correspondence relation between the prospected delivery condition and the plurality of future times to a user terminal;

displaying on regions of a delivery variation selection screen a corresponding plurality of content are displayed;

permitting selection of a content from among the plurality of contents displayed on the delivery variation selection screen by an input device of the user terminal; and storing the content that is selected being stored among a group of contents in a content storage section, wherein the plurality of content delivery variations includes a periodic content delivery variation by which a content is periodically delivered, wherein the delivery condition includes information showing a delivery charge and a waiting time to a next delivery start time in the periodic content delivery variation, and wherein the delivery condition is prospected for the periodic content delivery variation such that the delivery change becomes lower as the waiting time to the next delivery start time becomes longer.

* * * * *